United States Patent [19]

Jovanovic et al.

[11] Patent Number: 5,318,937
[45] Date of Patent: Jun. 7, 1994

[54] RUTHENIUM-CONTAINING PEROVSKITE MATERIALS, CATALYSTS AND METHODS

[75] Inventors: Dusan M. Jovanovic; Ana V. Terlecki-Baricevic; Bosko V. Grbic, all of Belgrade, Yugoslavia; Ronald L. Bradow, Raleigh, N.C.

[73] Assignee: The United States of America as represented by the Administrator of the U.S. Environmental Protection Agency, Washington, D.C.

[21] Appl. No.: 717,782

[22] Filed: Jun. 17, 1991

[30] Foreign Application Priority Data

Jun. 21, 1990 [YU] Yugoslavia ............................ 1211/90

[51] Int. Cl.$^5$ ..................... B01J 23/10; B01J 23/58; B01J 37/03; C01F 11/04
[52] U.S. Cl. ................... 502/303; 502/250; 502/525; 502/178; 423/596
[58] Field of Search ............... 502/303, 250, 525, 178; 423/596

[56] References Cited

U.S. PATENT DOCUMENTS

| | | | |
|---|---|---|---|
| 3,819,536 | 6/1974 | Dalla Betta et al. | 502/302 |
| 3,835,069 | 9/1974 | Gandhi | 502/302 |
| 3,897,367 | 7/1975 | Lauder | 502/303 |
| 3,900,428 | 8/1975 | Mai et al. | 502/303 |
| 3,901,828 | 8/1975 | Mai et al. | 502/303 |
| 3,905,918 | 9/1975 | Mai et al. | 502/303 |
| 3,907,968 | 9/1975 | Kobylinski et al. | 423/213.5 |
| 4,001,143 | 1/1977 | McCann, III | 502/302 |
| 4,049,583 | 9/1977 | Lauder | 502/303 |
| 4,110,254 | 8/1978 | Lauder | 502/313 X |
| 4,126,580 | 11/1978 | Lauder | 502/303 |
| 4,127,510 | 11/1978 | Harrison et al. | 502/303 |
| 4,134,852 | 1/1979 | Volin | 502/308 X |
| 4,151,123 | 4/1979 | McCann, III | 502/303 |
| 4,182,684 | 1/1980 | Lauder | 502/303 |

FOREIGN PATENT DOCUMENTS

| | | |
|---|---|---|
| 3504556A1 | 8/1986 | Fed. Rep. of Germany . |
| 61-82843 | 4/1986 | Japan . |
| 61-97032 | 5/1986 | Japan . |
| 61-149245 | 7/1986 | Japan . |
| 62-53737 | 3/1987 | Japan . |
| 62-65746 | 3/1987 | Japan . |
| 63-158130 | 7/1988 | Japan . |

*Primary Examiner*—Paul E. Konopka
*Assistant Examiner*—Douglas J. McGinty
*Attorney, Agent, or Firm*—Lowe, Price, LeBlanc & Becker

[57] ABSTRACT

Perovskite materials have a composition of the formula $La_{1-x}Sr_xCr_{1-y}Ru_yO_3$ wherein $0.1 \leq x \leq 0.5$ and $0.01 \leq y \leq 0.10$. The materials are used in catalysts for carbon monoxide oxidation, unsaturated hydrocarbon oxidation and/or nitrogen oxide reduction.

8 Claims, 1 Drawing Sheet

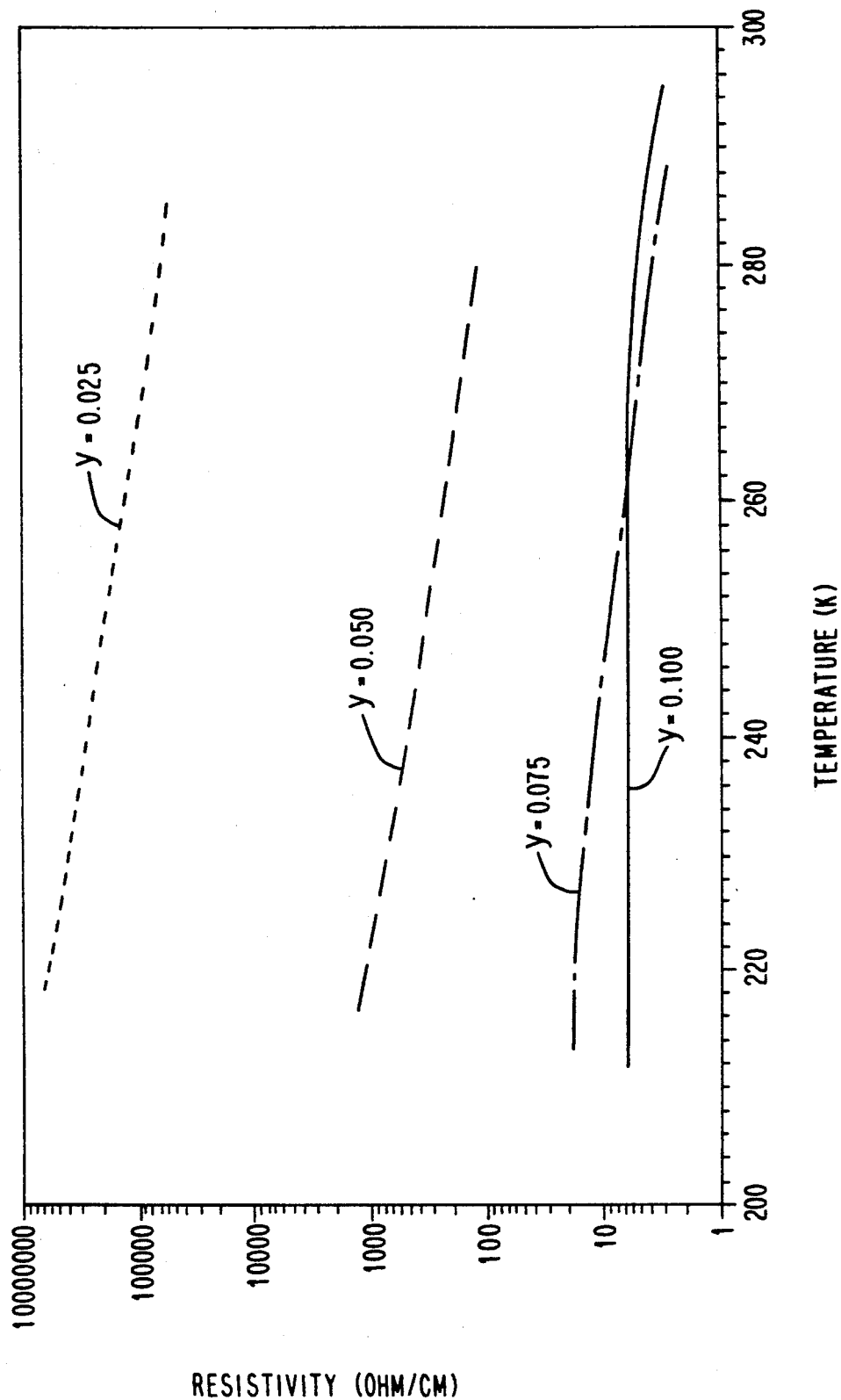

RUTHENIUM-CONTAINING PEROVSKITE MATERIALS, CATALYSTS AND METHODS

FIELD OF THE INVENTION

The present invention relates to ruthenium-containing perovskite materials and to catalysts comprising the ruthenium-containing perovskite materials. The catalysts are useful in carbon monoxide oxidation, unsaturated hydrocarbon oxidation and/or nitrogen oxide reduction and therefore are suitable for use in treating automotive exhaust gases and industrial waste gases.

BACKGROUND OF THE INVENTION

Various attempts have been made to use perovskite catalyst materials for the purification of exhaust gases from internal combustion engines such as automobile engines. The following references describe such materials: U.S. Pat. Nos. 3,900,428, 3,905,918, 4,049,583, 4,110,254, 4,134,852, 4,151,123 and 4,182,694, Japanese Kokai Nos. 61-082843, 61-097032, 61-149245, 62-053737, 62-065746 and 63-158130 and German Reference No. DE 3,504,556. The ability of such materials to effectively treat internal combustion exhaust gases depends on the three-way activity of the individual catalyst materials, i.e., the carbon monoxide oxidation, unsaturated hydrocarbon oxidation and nitrogen oxide reduction capabilities of the materials. Also important are the thermal stability and resistance to sulfur oxide poisoning of such materials when used as catalysts. The various perovskite catalyst materials disclosed in the aforementioned references exhibit varying degrees of three-way activity, thermal stability and sulfur oxide poisoning resistance.

It has also been suggested to use ruthenium as a catalyst component for carbon monoxide oxidation, unsaturated hydrocarbon oxidation and nitrogen oxide reduction owing to its three-way activity as set forth, for example, in U.S. Pat. Nos. 3,819,536, 3,835,069, 3,897,367, 3,900,428, 3,901,828, 3,905,918, 3,907,968, 4,001,143, 4,049,583, 4,110,254, 4,126,580, 4,134,852, 4,151,123 and 4,182,694. It has been shown that the addition of ruthenium to metallic platinum, palladium and rhodium catalysts on a support increases the selectivity of $NO_x$ reduction to nitrogen in richer mixtures and shifts the reaction of nitrogen oxides reduction to the region of lean mixtures. However, a disadvantage in the use of deposited ruthenium in such systems is the transformation of ruthenium, in the presence of oxygen, into toxic volatile $RuO_3$ and $RuO_4$ oxides.

Accordingly, a need exists for improved catalyst materials for use in treating internal combustion engine exhaust gases and industrial waste gases, which catalysts exhibit three-way activity for removal of carbon monoxide, unsaturated hydrocarbons and nitrogen oxides, good thermal stability and resistance to sulfur oxide poisoning.

SUMMARY OF THE INVENTION

Accordingly, it is an object of the present invention to provide improved catalyst materials. It is an additional object of the invention to provide improved catalyst materials which exhibit three-way activity for the removal of carbon monoxide, unsaturated hydrocarbons and nitrogen oxides from internal combustion engine exhaust gases and industrial waste gases. It is a further object of the invention to provide catalyst materials which exhibit high thermal stability. It is a further object of the invention to provide catalyst materials which exhibit resistance to sulfur oxide poisoning and therefore maintain good activity when operating in the presence of sulfur oxides.

These and additional objects are provided by the materials, catalysts and methods according to the present invention. More particularly, the present invention relates to perovskite materials having a composition of the formula $La_{1-x}Sr_xCr_{1-y}Ru_yO_3$ wherein $0.1 \leq x \leq 0.5$ and $0.01 \leq y \leq 0.10$. The perovskite materials of the invention are suitable for use as catalysts in removing carbon monoxide, unsaturated hydrocarbons and nitrogen oxides from automotive exhaust gases and industrial waste gases. The perovskite materials are advantageous in that they exhibit high thermal stability and resistance to sulfur oxide poisoning.

These and additional objects and advantages will be more fully apparent in view of the following detailed description.

BRIEF DESCRIPTION OF THE DRAWING

The drawing includes a single FIGURE which sets forth measured resistivities of several perovskite materials according to the present invention as described in Example 10.

DETAILED DESCRIPTION

The perovskite materials according to the present invention have a composition of the formula $La_{1-x}Sr_xCr_{1-y}Ru_yO_3$ wherein $0.1 \leq x \leq 0.5$ and $0.01 \leq y \leq 0.10$; preferably, x should be about 0.3 and $0.05 \leq y \leq 0.10$. It is well known that perovskite materials comprise structures having densely packed cubic lattice of the general formula $ABX_3$ where X is oxygen or a halogen. The perovskite materials may be simple or complex, and they crystallize in the $ABO_3$ form only if certain conditions relating to physicochemical and crystallographical parameters of the ions A and B are satisfied, as is known in the art. Properties of the perovskite materials are influenced by the function of the spin and the valence state of the metal ion in the B site which represents the catalytically active center of the perovskite structure.

Generally, the activity of perovskites with active base metals in the B site of the oxide matrix, for example, Co, Cu, Mn, Fe or the like, either alone or partially substituted with other base or noble metals, decreases in the presence of sulfur oxides, $SO_x$, in contaminated gas mixtures owing to the formation of base metal sulfates, thereby resulting in the destruction of the perovskite structure. The perovskite materials according to the present invention overcome this disadvantage. That is, by the incorporation of strontium into the A site of the perovskite material, in addition to lanthanum, causes the transition of a portion of the chromium ion into a higher valence state ($Cr^{+4}$) and satisfies the electroneutrality of the system, thereby allowing incorporation of a ruthenium ion into the lattice structure. The advantage of incorporation of ruthenium ion into the perovskite lattice, as opposed to the use of deposited metallic ruthenium as known in the prior art, is that the volatility of ruthenium oxides from the surface of the catalyst is greatly diminished. Thus, toxic volatile $RuO_3$ and $RuO_4$ are avoided. The dispersion and distribution of ruthenium in the B sites of the perovskite material provides Ru-Ru links and prevents agglomeration and partial recrystallization. Thus, the substitution of a portion of the chromium by ruthenium in the perovskite matrix structure results in the formation of monophase perovskite catalyst materials wherein the ruthenium ion occurs in the valence state most suitable for the perovskite crystal structure.

The perovskite materials according to the present invention are advantageous in that they exhibit a high thermal stability and are obtained by thermal treatment at temperatures above 700° C. As demonstrated in the examples, the perovskite materials may be formed according to several different processes. In a first embodiment, the perovskite materials may be formed by precipitating metal nitrates with a carbonate, homogenizing the resulting precipitate with ruthenium dioxide, and then calcining the resulting mixture. For example, lanthanum nitrate, strontium nitrate and chromium nitrate may be precipitated with a metal carbonate such as potassium carbonate. After being ground and homogenized, the mixture may be calcined at temperatures above about 700° C. In a second embodiment, the perovskite materials may be formed by homogenizing the respective metal oxides and then calcining the resulting mixture. For example, lanthanum oxide, strontium carbonate, chromium oxide and ruthenium dioxide may be ground and homogenized and then calcined at a temperature greater than about 700° C.

The perovskite materials are adapted for use as catalysts for carbon monoxide oxidation, unsaturated hydrocarbon oxidation and/or nitrogen oxide reduction, and are particularly suitable for use in treating automobile exhaust gases. As will be demonstrated in the examples below, the perovskite materials according to the invention exhibit a significantly increased operating window with respect to the well-known fuel/air equivalence ratio. When the perovskite materials are employed as catalysts, they may be deposited on supporting carrier materials in accordance with methods well known in the art. Suitable supporting carrier materials must have high temperature resistance (up to about 1200° C.) and include, but are not limited to, metallic supports, natural silicate materials, silicon carbide, titanium ceramic materials and zirconium ceramic materials. The resulting catalysts may be employed to treat automobile exhaust gases and/or industrial waste gases within a wide range of temperatures and oxido-reducing operating conditions.

The materials and methods according to the present invention are demonstrated by the following examples in which parts and percentages are by weight unless otherwise specified.

EXAMPLE 1

In this example, a single phase perovskite material of the nominal chemical composition $La_{0.7}Sr_{0.3}CrO_3$ was synthesized by dissolving 135.61 g of lanthanum nitrate, $La(NO_3)_3.6H_2O$, 28.40 g of strontium nitrate, $Sr(NO_3)_2$, and 179.03 g of chromium nitrate, $Cr(NO_3)_3.9H_2O$, in about 2 liters of distilled water with intense stirring, followed by addition of 911 ml of a 20% solution of potassium carbonate, $K_2CO_3$, in excess. The precipitate was filtered, washed with distilled water, dried overnight at 140° C. and calcined at about 600° C. for one hour. After being ground and homogenized, the catalyst bulk was, with periodic regrinding and rehomogenizing, heated for 72 hours at about 1000° C. The product comprised 100 g of brown powder of the noted chemical composition. The chemical and structural composition was characterized by x-ray diffraction analysis and x-fluorescence analysis.

EXAMPLE 2

In this example, a monophase perovskite material of the same chemical composition as in Example 1 was synthesized by grinding and homogenizing 51.02 g of lanthanum oxide, $La_2O_3$, 19.81 g of strontium carbonate, $SrCO_3$, and 34.00 g of chromium oxide, $Cr_2O_3$. After homogenization, the mass was heated at about 1000° C. for one hour. The catalyst bulk was then ground and homogenized and, with periodic regrinding and rehomogenization, it was heated for 72 hours at about 1000° C. The product comprised 100 g of brown powder of the noted chemical composition. The chemical and structural composition was characterized as in Example 1.

EXAMPLE 3

In this example, a monophase perovskite material of the nominal chemical composition $La_{0.7}Sr_{0.3}Cr_{0.95}Ru_{0.05}O_3$ was synthesized by dissolving 134.14 g of lanthanum nitrate, $La(NO_3)_3.6H_2O$, 28.10 g of strontium nitrate, $Sr(NO_3)_2$, and 168.23 g of chromium nitrate, $Cr(NO_3)_3.9H_2O$, in about 2 liters of distilled water with intense stirring, followed by addition of 877 ml of a 20% solution of potassium carbonate, $X_2CO_3$, in excess. The precipitate was filtered, washed with distilled water and dried overnight at 140° C. To this mass, 2.94 g of ruthenium oxide, $RuO_2$ was added with homogenizing and grinding, followed by heating for one hour at about 1000° C. After cooling, the catalyst bulk was heated for an additional 72 hours at about 960° C. with periodic grinding and homogenizing. The resulting product comprised 100 g of grey olive-green powder of the noted chemical composition. The chemical and structural composition was characterized as in Example 1. The amount of ruthenium in the catalyst corresponded to the stoichiometric value of the nominal perovskite composition.

EXAMPLE 4

In this example, a monophase perovskite material of the same chemical composition as in Example 3 was synthesized by grinding and homogenizing 50.47 g of lanthanum oxide, $La_2O_3$, 19.60 g of strontium carbonate, $SrCO_3$, 31.95 g of chromium oxide, $Cr_2O_3$, and 2.94 g of ruthenium oxide, $RuO_2$. After homogenization, the mass was heated for one hour at about 1000° C. The cooled catalyst bulk was calcined at about 960° C. for 72 hours with periodic grinding and homogenizing. The resulting product comprised 100 g of grey olive-green powder of the noted chemical composition. The chemical and structural composition was characterized as in Example 1. The amount of ruthenium in the catalyst corresponded to the stoichiometric value of the nominal perovskite composition.

EXAMPLE 5

In this example, a single phase perovskite material of the nominal chemical composition $La_{0.7}Sr_{0.3}Cr_{0.925}Ru_{0.075}O_3$ was synthesized by dissolving 133.42 g of lanthanum nitrate, 27.94 g of strontium nitrate and 162.92 g of chromium nitrate in about of 2 liters of distilled water with intense stirring, followed by addition of 061 ml of a 20% solution of potassium carbonate in excess. The precipitate was filtered, washed with distilled water and dried overnight at 140° C. To this mass, 4.39 g of ruthenium oxide, $RuO_2$, was added with homogenizing and grinding, followed by heating for one hour at about 1000° C. After cooling, the catalyst bulk was heated for 72 hours at about 960° C. with periodic grinding and homogenizing. The resulting product comprised 100 g of dark olive-green powder of the noted chemical composition. The chemical and structural composition was characterized as in Example 1. The amount of ruthenium in the catalyst corresponded to the stoichiometric value of the nominal perovskite composition.

EXAMPLE 6

In this example, a monophase perovskite material of the same chemical composition as in Example 5 was synthesized by grinding and homogenizing 50.19 g of lanthanum oxide, 19.49 g of strontium carbonate, 30.94 g of chromium oxide and 4.39 g of ruthenium oxide, $RuO_2$. After homogenization, the mass was heated for one hour at about 1000° C. The cooled catalyst bulk was then heated at about 960° C. for 72 hours with periodic homogenizing and grinding. The resulting product comprised 100 g of a dark olive-green powder of the noted chemical composition. The chemical and structural composition was characterized as in Example 1. The amount of ruthenium in the catalyst corresponded to the stoichiometric value of the nominal perovskite composition.

EXAMPLE 7

In this example, a monophase perovskite material of the nominal chemical composition $La_{0.7}Sr_{0.3}Cr_{0.90}Ru_{0.10}O_3$ was synthesized by dissolving 132.70 g of lanthanum nitrate, 27.79 g of strontium nitrate, and 157.66 g of chromium nitrate in about 2 liters of distilled water with intense stirring, followed by addition of 844 ml of a 20% solution of potassium carbonate in excess. The precipitate was filtered, washed with distilled water and dried overnight at 140° C. To this mass, 5.83 g of ruthenium oxide, $RuO_2$, was added with homogenizing and grinding, followed by heating for one hour at about 1000° C. After cooling, the catalyst bulk was heated for 72 hours at about 960° C. with periodic grinding and homogenizing. The resulting product comprised 100 g of very dark olive-green powder of the noted chemical composition. The chemical and structural composition was characterized as in Example 1. The amount of ruthenium in the catalyst corresponded to the stoichiometric value of the nominal perovskite composition.

EXAMPLE 8

In this example, a single phase perovskite of the same chemical composition as in Example 7 was synthesized by grinding and homogenizing 49.92 g of lanthanum oxide, 19.39 g of strontium carbonate, 29.94 g of chromium oxide and 5.83 g of ruthenium oxide, $RuO_2$. After homogenization, the mass was heated for one hour at about 1000° C. The cooled catalyst bulk was calcined at about 960° C. for 72 hours with periodic grinding and homogenizing. The resulting product comprised 100 g of very dark olive-green powder of the noted chemical composition. The chemical and structural composition was characterized as in Example 1. The amount of ruthenium in the catalyst corresponded to the stoichiometric value of the proposed nominal perovskite composition.

EXAMPLE 9

In this example, catalytic activities in the oxidation of carbon monoxide (CO) and unsaturated hydrocarbons (HC) and in the reduction of nitrogen oxides ($NO_x$) of three samples of the aforedescribed catalyst series of the $La_{1-x}Sr_xCr_{1-y}Ru_yO_3$ type wherein $x=0.3$ and $y=0.05$, 0.075 and 0.10 respectively (the materials described in Examples 3–8), were measured on laboratory pulse-flame apparatus using a space velocity of 32,500 $h^{-1}$, a temperature of 550° C., an $SO_2$ concentration of 17.5 ppm and a wide redox potential (R). The redox potential (R) is defined as the ratio of the sum of the reducing (CO, HC and $H_2$) components and the oxidizing ($O_2$ and $NO_x$) components in the exhaust gas stream. Table 1 shows the experimentally obtained "windows" of the fuel/air equivalence ratio for three examples of the present perovskite catalysts.

TABLE 1

| Experimentally Obtained "Window" for Three Ruthenium Perovskite Catalysts | |
| --- | --- |
| CATALYST | "WINDOW" AT 80% CONVERSION |
| $La_{0.7}Sr_{0.3}Cr_{0.95}Ru_{0.05}O_3$ | 0.75–1.40 |
| $La_{0.7}Sr_{0.3}Cr_{0.925}Ru_{0.075}O_3$ | 0.80–1.35 |
| $La_{0.7}Sr_{0.3}Cr_{0.90}Ru_{0.10}O_3$ | 0.80–1.30 |

As is well known in the automobile exhaust gas catalyst art, the fuel-air equivalence ratio refers to the fuel/air mass flow ratio with which the catalyst is effective as compared with the stoichiometric fuel/air ratio. In conventional automobile exhaust gas catalysts, the equivalence ratio is generally from about 1.0–1.1. Thus, the perovskite materials according to the present invention provide significantly improved catalysts which exhibit greatly expanded equivalence ratios for carbon monoxide oxidation, unsaturated hydrocarbon oxidation and nitrogen oxide reduction. Thus, the perovskite materials according to the present invention are particularly suitable for the removal of carbon monoxide, unsaturated hydrocarbons and/or nitrogen oxides from exhaust gases of internal combustion engines and industrial waste gases. The catalysts produced from the perovskite materials according to the present invention may be employed within a wide range of temperatures and oxido-reducing operating conditions.

EXAMPLE 10

In this example, the resistivity of four perovskite materials according to the present invention wherein $x=0.3$ and $y=0.025$, 0.050, 0.075 and 0.100, respectively, were measured as a function of temperature. The measured resistivity results are set forth in the FIGURE. The results set forth in the Figure demonstrate typical negative temperature coefficients for semiconductors and decreasing resistivity with increasing ruthenium content in the perovskite matrix. These results suggest that the perovskite catalysts according to the invention can be preheated by passing electrical current through the material. Thus, the use of the perovskite materials in catalysts for automobile exhaust gases could result in a decrease in cold-start emissions.

The preceding examples are set forth to illustrate specific embodiments of the invention and are not intended to limit the scope of the compositions and methods of the present invention. Additional embodiments and advantages within the scope of the claimed invention will be apparent to one of ordinary skill in the art.

What is claimed is:

1. A perovskite material having a single phase and a composition of the formula $La_{1-x}Sr_xCr_{1-y}Ru_yO_3$ wherein $0.1 \leq x \leq 0.5$, $0.01 \leq y \leq 0.075$, said material is resistant to sulfur oxide poisoning, and said material is resistant to decomposition at high temperatures.

2. A perovskite material as defined by claim 1, wherein x is about 0.3.

3. A perovskite material as defined by claim 1, wherein $0.05 \leq y \leq 0.075$.

4. A perovskite material as defined by claim 1, wherein y is 0.05.

5. A perovskite material as defined by claim 1, wherein y is 0.075.

6. A catalyst for carbon monoxide oxidation, unsaturated hydrocarbon oxidation, or nitrogen oxide reduction, comprising a perovskite material having a single phase supported on a carrier, wherein:

said material has a composition of the formula $La_{1-x}Sr_xCr_{1-y}Ru_yO_3$ wherein $0.1 \leq x \leq 0.5$ and $0.01 \leq y \leq 0.075$;

said material is resistant to sulfur oxide poisoning;

said material is resistant to decomposition at high temperatures; and said carrier is selected from the group consisting of metallic supports, natural silicate materials, silicon carbide, titanium ceramics and zirconium ceramics.

7. A perovskite material as defined by claim 1, wherein the perovskite material is formed by dissolving lanthanum nitrate, strontium nitrate and chromium nitrate in distilled water, precipitating said nitrates with a solution of potassium carbonate, homogenizing and grinding the resulting precipitate with ruthenium dioxide, and calcining the resulting mixture with periodic homogenizing and grinding.

8. A perovskite material as defined by claim 1, wherein the perovskite material is formed by grinding and homogenizing lanthanum oxide, strontium carbonate, chromium oxide and ruthenium dioxide, and calcining the resulting mixture with periodic grinding and homogenizing.

* * * * *